United States Patent [19]

Yoshimura

[11] 3,970,503
[45] July 20, 1976

[54] METHOD OF MANUFACTURING A BAG
[75] Inventor: Takehisa Yoshimura, Suita, Japan
[73] Assignee: Ruby Net Hosoki Kabushiki Kaisha, Osaka, Japan
[22] Filed: Dec. 27, 1974
[21] Appl. No.: 536,915

[52] U.S. Cl. .................................. 156/323; 93/35 R
[51] Int. Cl.² .............................................. C09J 5/10
[58] Field of Search ............ 156/70, 217, 218, 227, 156/244, 250, 278, 289, 292, 295, 305, 323; 93/35 R, 35 DS, 35 MW; 53/28, 180

[56] References Cited
UNITED STATES PATENTS

| | | | |
|---|---|---|---|
| 2,380,914 | 8/1945 | Billeb | 156/292 |
| 3,196,757 | 7/1965 | Samways | 156/70 |
| 3,505,140 | 4/1970 | Dunn | 156/289 |
| 3,554,368 | 1/1971 | Nagel | 93/35 MW |

Primary Examiner—Caleb Weston
Attorney, Agent, or Firm—Wenderoth, Lind & Ponack

[57] ABSTRACT

A method of manufacturing a bag from a cylindrical net-like bag blank made of synthetic fibers or synthetic resin. The method involves the steps of inserting into said bag blank a resilient plate having a length which is at least equal to the depth of the bag to be manufactured and a width which is substantially equal to the circumferential length of said bag blank in such a way that the plate is not overlapped with the bag bottom forming portion of the bag blank but is overlapped with the bag mouth forming portion of the bag blank. A molten polyethylene resin is applied as one or more filaments or strips extending widthwise of the bags to be manufactured to the opposite outer surfaces of the bag blank in the bag mouth forming portion and to at least one outer surface of the bag blank in the bag bottom forming portion, and immediately thereafter the applied molten polyethylene resin is cooled under pressure to embed the synthetic fibers or synthetic resin of the bag blank into the applied polyethylene resin and to solidify the latter.

6 Claims, 7 Drawing Figures

METHOD OF MANUFACTURING A BAG

The present invention relates to a method of manufacturing a bag or bags from a cylindrical net-like bag blank consisting of synthetic fibers or synthetic resin.

The bag is made from a net-like blank which, in turn, is made by knitting or weaving synthetic fibers for example polyethylene monofilaments, or split yarns of synthetic resin for example polyethylene. The bags made from an extruded synthetic sheet are opened into net-like form by exerting a pulling force against the sheet transversely to elongated incisions cut into the sheet and are used to receive goods such as onions, potatoes, oranges, etc. which is relatively heavy and require air permeability, because these bags are strong enough to receive the goods of the nature described above, have required air permeability and are low in manufacturing cost.

Generally, such bags are made by closing one end of a cylindrical net-like bag blank opened at the opposite ends. The closed end serves as a bottom of the bag and the opened end serves as a mouth through which the goods to be received are put into the bag, and, thereafter, the opened end is closed to prevent the goods from falling out of the bag.

It was a conventional way to sew the end portions of the bag blank by means of a sewing machine to close them. However, such method of closing the end portions of the bag blank is extremely troublesome, and when heavy goods are received in the bag the meshes are deformed due to the elasticity of the bag blank material and due to the weight of the goods received in the bag, the seam opens. Furthermore, when a knitted bag blank is used, a run cannot be avoided when any one of meshes has been opened due to said deformation.

Furthermore, when it is required to provide a strap around the mouth portion of the bag to enable to close it by pulling and tying the strap, it is conventional to form an elongated closed strap holding channel by sewing the mouth portion of the bag. However, this is also extremely troublesome.

In order to avoid the troublesome sewing operations, it can be contemplated to use adhesives. However, there has not been developed or proposed in the past any adhesive which is able to join the bag blank having coarse meshes of synthetic resin or synthetic fibers with sufficient strength.

Thus, it is an object of the present invention to provide an improved method of manufacturing a bag which overcomes the various drawbacks as described above.

In accordance with the present invention, there is provided a method of manufacturing a bag from a cylindrical net-like bag blank consisting of synthetic fibers or synthetic resin comprising the steps of inserting into said bag blank a resilient plate having length which is at least equal to the depth of the bag to be manufactured and width which is substantially equal to the circumferential length of said bag blank in such way that the plate is not overlapped with a bag bottom forming portion of said bag blank, but is overlapped with a bag mouth forming portion of said bag blank, applying a molten polyethylene resin as one or more filaments or strips extending widthwise of the bags to be manufactured to the opposite outer surfaces of said bag blank in said bag mouth forming portion and to at least one outer surface of said bag blank in said bag bottom forming portion, and immediately thereafter cooling under pressure said applied molten polyethylene resin to embed the synthetic fibers or synthetic resin comprising said bag blank into said applied polyethylene resin and to solidify the latter.

The plate inserted into the cylindrical bag blank is preferably made of a material to which the applied molten polyethylene does not easily adhere. For instance, the plate may be a cardboard.

The molten polyethylene resin may be applied to the bag blank by means of ejection nozzle means relative to which the bag blank is moved along a predetermined path. Each nozzle means may have a plurality of small apertures to eject the molten polyethylene resin in the form of filaments, or may have one or more slits to eject the molten polyethylene resin in the form of strip or strips. One of the ejection nozzle means is located in opposition to the bag mouth forming portion of the bag blank and another ejection nozzle means is located in opposition to the bag bottom forming portion of the bag blank. By moving the bag blank widthwise thereacross, the molten polyethylene resin is applied to the bag mouth forming portion and the bag bottom forming portion as one or more filaments or strips extending widthwise of the bag blank. Said one ejection nozzle means related to the bag mouth forming portion is arranged so that it applies the molten polyethylene resin to the opposite outer surfaces of the bag blank. Thus, the said one ejection nozzle means may comprise two nozzles placed at the opposite sides of the bag blank, while said another ejection nozzle means related to the bag bottom forming portion is arranged so that it applies the molten polyethylene resin at least to one outer surface of the bag blank. Thus said another ejection nozzle means may comprise one nozzle placed at one side of the bag blank or two nozzles placed at the opposite sides of the bag blank.

The applied molten polyethylene resin has to be cooled under pressure immediately after it has been applied to the bag blank. By applying the pressure the applied polyethylene resin still in the molten or plastic state is easily deformed to embed the synthetic fibers or synthetic resin comprising said bag blank thereinto. By cooling the applied polyethylene resin it is solidified in the deformed state.

The application of pressure to and cooling of the applied molten polyethylene resin can be effected by passing the bag blank to which the molten polyethylene resin has been applied between a pair of cooled resilient pressing rollers. The cooling of the rollers may be effected by supplying or spraying water onto the outer surface of the rollers. Such water also serves to prevent the adhesion of the molten polyethylene resin to the outer surface of the rollers.

The resiliency of said rollers and said plate promotes or facilitates the embedding or embracing of the synthetic fibers or synthetic resin consisting the bag blank into the applied molten polyethylene resin.

A further pair of rollers may be provided downstream of and adjacent to the said first pair of cooled pressing rollers to pull the bag blank from between the latter rollers to strip the applied polyethylene resin from the outer surface of the cooled rollers in the event the applied polyethylene resin has adhered thereto.

The invention will be better understood from the following description taken in connection with the accompanying drawings in which.

Figure 7:
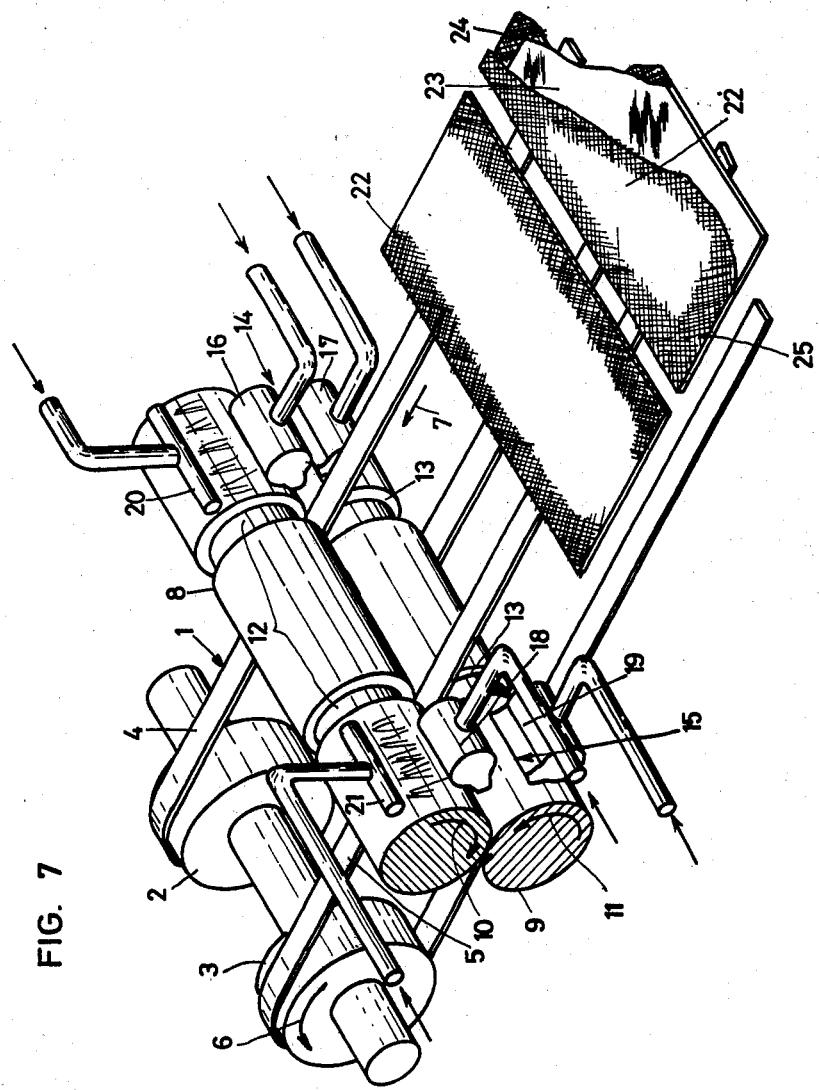
FIG. 7 is a perspective view of an apparatus which may be used to work the method of the present invention.

With reference now to the drawings and more particularly to FIG. 7, there is illustrated an apparatus which may be used to work the method of the present invention.

In FIG. 7, a belt conveyor 1 is comprised of end pulleys 2 and 3 around which belts 4 and 5, respectively, pass. The pulleys 2 and 3 are driven by a suitable power source (not shown in the drawings) in the direction designated by the arrow 6 to drive the belts in the direction designated by the arrow 7. An additional pair of rollers 8, 9 have resilient or deformable outer surfaces. The rollers 8 and 9 are driven by a suitable power source (not shown in the drawings) in the direction shown by the arrows 10 and 11, respectively. The rollers 8 and 9 are grooved on the peripheral or outer surface thereof with grooves 12 and 13, respectively, to accomodate the belts 4 and 5 therein.

Nozzle means 14, 15 ejecting the molten polyethylene resin onto the outer surface of a bag blank. These ejection nozzle means are located upstream of and adjacent to the rollers 8 and 9. In the illustrated apparatus, the ejection nozzle means 14 comprises a pair of nozzles 16 and 17, and the ejection nozzle means 15 comprises a pair of nozzles 18 and 19. The nozzles 16 and 17 are located on the opposite sides of and symmetrically relative to a plane passing through the upper runs of the belts 4 and 5 and are somewhat rearwardly inclined. The nozzles 18 and 19 are also located similarly to the nozzles 16 and 17. Each nozzle may have a plurality of ejection apertures spaced apart by a predetermined distance from each other in the transverse direction of the apparatus.

Water spray means 20, 21 spray water onto the outer surface of the roller 8 to cool it.

A cylindrical net-like bag blank 22 consists of synthetic fibers or synthetic resin and is opened at the opposite ends. In FIG. 7 one of the bag blanks 22 is partially broken to show a plate 23 inserted thereinto. The plate 23 is made of resilient material, such as cardboard, and has a length which is at least equal to the depth of the bag to be manufactured and a width which is substantially equal to the circumferential length of the bag blank. Thus, when the plate 23 is inserted into the bag blank it becomes flat. The plate 23 is inserted into the bag blank 22 in such way that the plate is not overlapped with a bag bottom forming portion 24 of the bag blank 22 but is overlapped with a bag mouth forming portion 25 of the bag blank 22.

The nozzles 16 and 17 are located to apply the molten polyethylene resin to the bag bottom forming portion 24 and the nozzles 18 and 19 are located to apply the molten polyethylene resin to the bag mouth forming portion 25. It should to be noted that either of the nozzles 16 or 17 may be omitted since the molten polyethylene resin applied to one outer surface of the bag blank 22 in said bag bottom forming portion can reach the other outer surface without being obstructed by the inserted plate 23. However, for the bag mouth forming portion 25 of the bag blank 22, two nozzles 18 and 19 must be provided to apply the molten polyethylene resin to the opposite outer surfaces of the bag blank.

When a bag is manufactured by the apparatus of FIG. 7, the bag blank 22 into which the plate 23 is inserted is placed on the belts 4 and 5. Then, the bag blank 22 is transferred toward the rollers 8 and 9. Before entering into the nip between the rollers 8 and 9, the molten polyethylene resin is applied to the opposite outer surfaces of the bag bottom forming portion 24 and the bag mouth forming portion 25 of the bag blank by means of the nozzles 16, 17 and 18, 19 respectively, as a plurality of filaments in this case. Immediately thereafter, namely when the applied polyethylene resin is in the molten or plastic state, the bag blank 22 is passed through the nip between the rollers 8 and 9 which are always water cooled by means of the water spray means 20 and 21. At this time, as stated above, the applied polyethylene resin is still in the molten or plastic state, thus the applied polyethylene resin is easily deformed by the pressure exerted by the rollers 8 and 9 to embed the synthetic fibers or synthetic resin comprising said bag blank into said applied polyethylene resin. Furthermore, the molten polyethylene resin as applied to the opposite outer surfaces of the bag bottom portion joins together to close the bag bottom forming portion. The applied molten polyethylene resin is cooled by means of the cooling rollers and is thus solidified in the deformed state.

Figure 1:
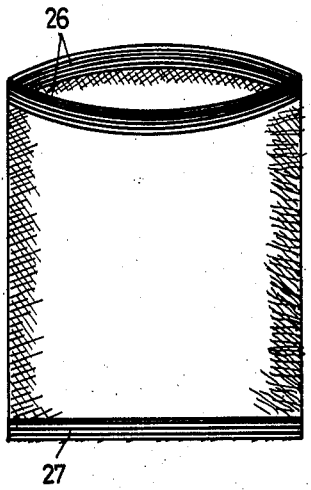
FIG. 1 is a plan view of a bag manufactured according to the method of the present invention.

When the bag blank thus processed is delivered from the nip between the rollers 8 and 9, the filaments of polyethylene as ejected by said nozzles and connecting adjacent two bag blanks are cut and the plate 23 is removed from the processed bag blank, thereafter it is turned inside out to obtain the bag such as shown in FIG. 1. In FIG. 1, the solidified filaments 26 of polyethylene are applied by the nozzles 18 and 19 to the bag mouth forming portion, and the solidified filaments 27 of polyethylene are applied by the nozzles 16 and 17 to the bag bottom forming portion.

As stated hereinbefore, the ejection nozzle means 14 for the bag bottom forming portion of the bag blank may comprise only one nozzle. In such case it is preferable to eject a large amount of molten polyethylene resin onto one outer surface of the bag blank so as to enable it to reach or penetrate to the other outer surface of the bank blank. Otherwise, it is also possible to apply the molten polyethylene resin to the other outer surface of the bag blank after the molten polyethylene resin applied to said one outer surface has solidified.

According to another aspect of the present invention, a tape of polyethylene film is secured to the bag mouth forming portion of the bag blank.

Figure 3:
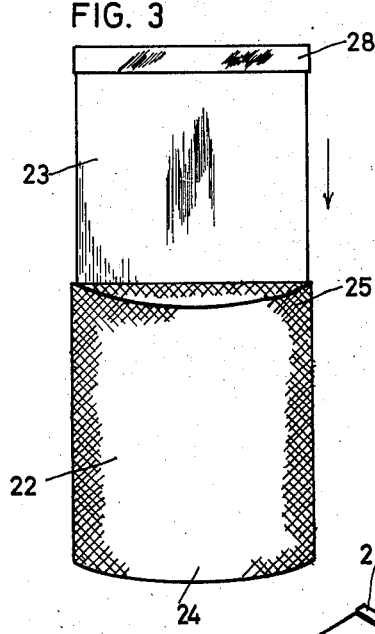
FIG. 3 is a plan view showing a bag blank and a plate to be inserted therein.

This method is illustrated in FIG. 3. In FIG. 3, a tape 28 of polyethylene film is carried by one end of the plate 23 so that the tape 28 is placed in said bag mouth forming portion of the bag blank 22 when the plate 23 is inserted into the bag blank 22 in position. When the molten polyethylene resin is applied to said bag mouth forming portion, the tape 28 is secured to the bag blank by means of said applied polyethylene resin to increase the mechanical strength of the mouth portion of the bag. The bag thus obtained is illustrated in FIG. 3. The tape 28 may be cut from a long film or may be cut from a tube, but in any event it is preferable that the tape 28 completely cover the entire circumferential length of the bag mouth forming portion.

According to a still further aspect of the present invention a strap for closing the mouth of the bag is provided.

Figure 4:
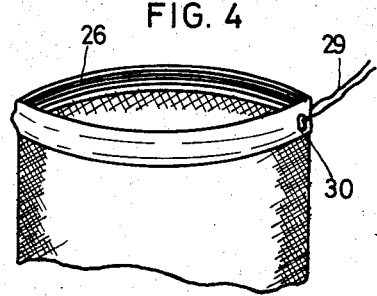
FIG. 4 is a plan view of a part of still another bag manufactured according to the method of the present invention.

In order to provide such a strap in the mouth portion of the bag, a strap 29 (FIG. 4) is wound around the tape 28 of FIG. 3 approximately in middle portion of thereof before the plate 23 is inserted into the bag blank 22. The opposite ends of the strap 29 may be easily releasably tied together at a predetermined position or may be easily strippably adhered to the tape 28 by means of a suitable adhesive. After the plate 23 is inserted into the bag blank 22 in position, the molten polyethylene resin is applied to said bag mouth forming portion only beside said strap 29. After the thus processed bag blank has been delivered from the nip between the rollers 8 and 9, and after it has been turned inside out, a pair of openings 30 (one of them is seen in FIG. 4) are cut adjacent to said predetermined position to release or strip the opposite ends of the strap 29 and then the freed opposite ends of the strap 29 are pulled out of the openings 30. In this case the nozzles 18 and 19 should not have an ejection aperture in the position opposed to the strap 29.

In the methods described hereinbefore, only one bag is manufactured from one bag blank.

According to the present invention, there is also provided a method of manufacturing a plurality of bags from one bag blank. This method is shown in FIG. 5.

Figure 5:
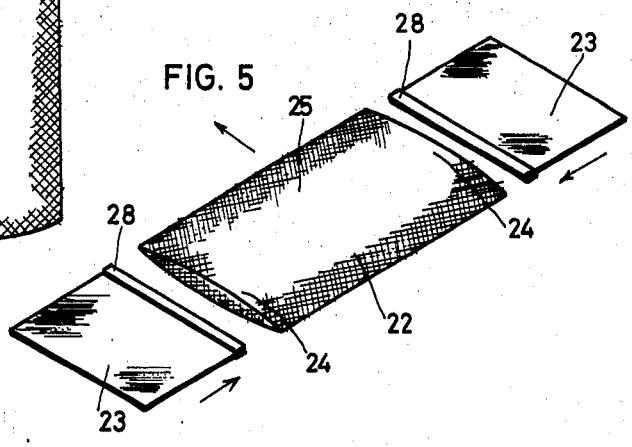
FIG. 5 is a plan view showing a bag blank and two plates to be inserted therein when two bags are to be manufactured from one bag blank.

In the embodiment of FIG. 5, two bags are manufactured from one bag blank 22. For this purpose two plates 23 are used. These plates 22 have lengths substantially equal to the depth of the bags to be manufactured. Each of the plates 22 carries on one end the tape 28 in the same way as described in connection with FIGS. 2 and 3. These plates 22 are inserted into the bag blank 22 from the opposite open ends thereof with a small gap left between the plates 22, and then this bag blank is placed on the belts 4 and 5 (FIG. 7). In this case, it will be noted that another ejection nozzle means and water spray means (not shown in the drawings) will have to be provided in the middle portion along the rollers 8 and 9 to apply the molten polyethylene resin to the bag mouth forming portions now located at the middle portions of the bag blank and to cool the rollers, respectively. The bag blank 22 delivered from the nip between the rollers 8 and 9 is cut at the place of said gap, manually or by a knife arranged in a suitable place of the apparatus, into two bags. It will be appreciated that more than two bags may be manufactured from one bag blank in the similar way.

According to a still further aspect of the present invention, a label of polyethylene resin on which desired informations, such as net weight and/or the production area of the goods received in the bag, manufacturer of the goods, trade mark, etc,. are printed is secured to the bag.

Figure 2:
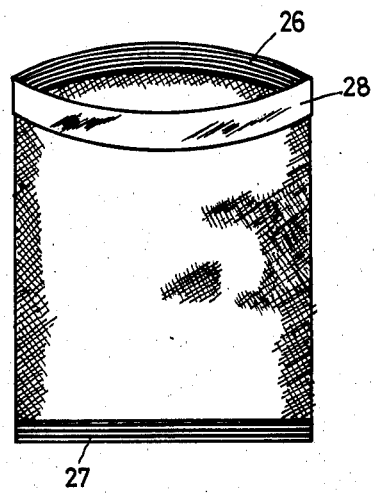
FIG. 2 is a plan view of another bag manufactured according to the method of the present invention.
Figure 6:
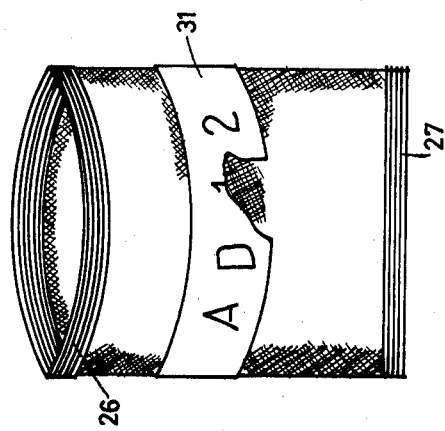
FIG. 6 is a plan view of an additional bag manufactured according to the method of the present invention.

This can be effected in the way similar to the method as described in connection with FIGS. 2 and 3. In this case, the label 31 (FIG. 6) is carried by the plate in the desired position with the front face, i.e. printed face, being faced against the surface of the plate. The label may extend for any length on one side surface of the plate 23 or may extend across the entire circumference of the plate 23. The apparatus of FIG. 7, in this case, is provided with additional ejection nozzle means and water spray means to apply the molten polyethylene resin to the area of the bag blank where the label is to be secured. The bag thus obtained is shown in FIG. 6.

According to a still another aspect of the present invention, the molten polyethylene resin is applied to the opposite outer surfaces of the bag blank as a plurality of filaments or strips extending widthwise of the bag to be manufactured also in the portion of the bag blank other than the bag mouth forming portion and bag bottom forming portion to entirely reinforce the bag. This is useful for a knitted bag blank since the polyethylene resin filaments or strips applied through the entire outer surface of the bag compensate for the stretchability inherent in the knittings.

For the purpose of illustration only, this invention will now be illustrated by the following examples. Of course, this invention shall not be limited to the following examples.

EXAMPLE 1

A circular knitted fabric of polyethylene monofilaments having the circumferential length of 80 cm was cut into the length of 82 cm to obtain a bag blank 22. A cardboard 23 of 40 cm width and 80 cm length was inserted into the bag blank in such way that one lengthwise edge of the cardboard plate 23 aligns with one opened end of the bag blank. Thus, the other open end of the bag blank was left uncovered by the cardboard 23 by 2 cm. This uncovered end portion of the bag blank constituted the bag bottom forming portion 24 and the said one open end portion covered by the plate 23 constituted the bag mouth forming portion 25. This bag blank 22 was placed on the belts 4 and 5 in the state as shown in FIG. 7. By means of the nozzles 16 and 17, four filaments of the molten low density polyethylene resin at 140°C spaced from each other by 4 mm were applied to the bag bottom forming portion 24 and by means of the nozzles 18 and 19, 20 filaments of the same molten polyethylene resin spaced from each other by 2 mm were applied to the bag mouth forming portion 25.

In this example an additional pair of pressing rollers (not shown in the drawings) provided downstream of and adjacent to the rollers 8 and 9 pulled the processed bag blank 22 from between the nip between the rollers 8 and 9 and stripped the polyethylene resin adhered to the rollers 8 and 9. The thus obtained bag blank was turned inside out and a bag of 80 cm depth and 80 cm circumferential length was obtained. Twenty Kg of potatoes were put into the bag thus manufactured and the mouth portion of the bag was closed by sewing with of a sewing machine. There occurred no faults such as stretching of the seam.

EXAMPLE 2

A circular knitted fabric of high density polyethylene monofilaments having the circumferential length of 54 cm was cut into the length of 74 cm to obtain a bag blank 22. By using this bag blank 22 two bags were manufactured in the way as shown in FIG. 5. In this case, two cardboard plates 23 each having 35 cm length and 27 cm width were used. A tube of polyethylene film of 54 cm circumference length was cut into 5 cm length to obtain two tapes 28 (FIG. 5) each having 5 cm width and 54 cm circumferential length. These tapes 28 were fitted on one end of each of the cardboard plate 23 as shown in FIG. 5 and inserted into the bag blank 22 from the opposite open ends thereof with a 1 cm gap left between the tapes 28 carried by the two cardboard plates 23 to leave a 1.5 cm uncovered portion (bag bottom forming portion) at each end of the bag blank. The bag blank 22 was processed by the apparatus of FIG. 7 in the same way as described hereinbefore in connection with FIG. 5. By means of the nozzles 16, 17 and 18 and 19, three filaments of the molten low density polyethylene resin at 140°C spaced from each other by 4 mm were applied to each bag bottom forming portion 24 at the opposite ends of the bag blank 22. Furthermore, by means of additional nozzles (not shown in the drawings) provided at the middle portion along the rollers 8 and 9, 15 filaments of the same polyethylene resin spaced apart from each other by 3 mm were applied to each bag mouth forming portion 25 which was located in middle portion of the bag blank 22.

The thus processed bag blank was manually cut at the middle portion thereof to obtain two bags each having 35 cm depth and 54 cm circumferential length. Such bag was suitable to receive 2 ~ 3 Kg of oranges or potatoes. The mouth portion of the bag could be closed by means of Hotchkiss without any problem.

EXAMPLE 3

In the Example 1, the nozzles 16, 17, 18 and 19 of FIG. 7 were replaced by a pair of elongated nozzles extending transversely of the apparatus. By means of such nozzles the molten polyethylene resin, the same as stated in the Example 1, was applied to the bag bottom forming portion and bag mouth forming portion of the bag blank in the manner as stated in Example 1. In addition to this, the same molten polyethylene resin was applied by means of said pair of nozzles to the opposite outer surfaces of the bag blank in the portion between said bag bottom forming portion and bag mouth forming portion as a plurality of filaments spaced from each other by 6 mm. The bag thus obtained was well reinforced entirely by the applied polyethylene resin, the stretchability inherent to the knittings was removed, and the shape of the bag was maintained when 20 Kg of potatoes was put in the bag.

EXAMPLE 4

In the Example 1, a label 31 of polyethylene film was put on the cardboard plate 23 in the middle portion thereof. By means of an additional nozzle the same molten polyethylene resin was applied to the outer surface of the bag blank where it is in contact with the label as a plurality of filaments spaced from each other by 8 mm. The label 31 was rigidly secured to the bag blank.

While a few embodiments of the invention have been illustrated and described in detail, it is particularly understood that the invention is not limited thereto or thereby. For instance, the nozzles 16, 17, 18 and 19 may eject the molten polyethylene resin in the form of one or more strips.

I claim:
1. A method of manufacturing a plurality of bags from a single cylindrical net-like bag blank consisting of synthetic fibers or synthetic resin comprising the steps of:
  inserting into said bag blank a plurality of resilient plates each having a length at least equal to the depth of the bags to be manufactured and a width substantially equal to the circumferential length of said bag blank in such a way that the plates are not overlapped with the related bag bottom forming portions of said bag blank, but are overlapped with the related bag mouth forming portions of said bag blank;
  applying a molten polyethylene resin in the form of at least one filament or strip extending widthwise of the bags to be manufactured to the opposite outer surfaces of said bag blank in said bag mouth forming portions and to at least one outer surface of said bag blank in said bag bottom forming portions; and
  immediately after applying said resin, cooling under pressure said applied molten polyethylene resin to embed the synthetic fibers or synthetic resin of said bag blank into said applied polyethylene resin and to solidify the latter; and
  severing the thus processed bag blank into individual bags.

2. A method of manufacturing a bag from a cylindrical net-like bag blank consisting of synthetic fibers or synthetic resin comprising the steps of:
  inserting into said bag blank a resilient plate having a length which is at least equal to the depth of the bag to be manufactured and a width which is substantiallyy equal to the circumferential length of said bag blank in such way that the plate is not overlapped with a bag bottom forming portion of said bag blank, but is overlapped with a bag mouth forming portion of said bag blank;
  applying a molten polyethylene resin in the form of at least one filament or strip extending widthwise of the bag to be manufactured to the opposite outer surfaces of said bag blank in said bag mouth forming portion and to at least one outer surface of said bag blank in said bag bottom forming portion; and
  immediately after applying said resin, cooling under pressure said applied molten polyethylene resin to embed the synthetic fibers or synthetic resin of said bag blank into said applied polyethylene resin and to solidify the latter.

3. A method of manufacturing a bag as claimed in claim 2 wherein said molten polyethylene resin applied to the opposite outer surfaces of said bag blank as a plurality of filaments or strips extending widthwise of the bag to be manufactured is also applied to portions of said bag blank other than said bag mouth forming portion and bag bottom forming portion.

4. A method of manufacturing a bag as claimed in claim 2, wherein a label of polyethylene resin on which desired information is printed is carried by said plate at a desired position thereof with the front face of the label being faced to a surface of said plate; and
  said label is secured to said bag blank by means of molten polyethylene resin applied to the outer surface of said bag blank above the position of said label on said plate.

5. A method of manufacturing a bag as claimed in claim 2 wherein said plate carries thereon a tape of polyethylene film to be placed in said bag mouth forming portion of said bag blank, said tape being secured to said bag blank in said bag mouth forming portion by means of said applied molten polyethylene resin.

6. A method of manufacturing a bag as claimed in claim 5 wherein:
  a strap is wound around said tape of polyethylene film approximately in middle portion thereof; and
  the molten polyethylene resin is applied to said bag mouth forming portion of said bag blank only beside said strap.

* * * * *